Oct. 3, 1967 A. HOFFMANN 3,345,470

SWIVEL ARM TELEPHONE MOUNTINGS

Filed May 26, 1964 2 Sheets-Sheet 1

United States Patent Office 3,345,470

Patented Oct. 3, 1967

3,345,470

SWIVEL ARM TELEPHONE MOUNTINGS

Arthur Hoffmann, 378 Norstrasse, Zurich 10/37, Switzerland

Filed May 26, 1964, Ser. No. 370,279
Claims priority, application Switzerland, Apr. 1, 1964, 4,289/64
6 Claims. (Cl. 179—150)

ABSTRACT OF THE DISCLOSURE

A swivel arm for telephone mounting that defines a two-piece closure for the telephone cable.

The present invention relates to a swivel arm telephone mounting apparatus with a hollow swivel arm carrying a platform for the telephone, and has the primary object of obviating the considerable waste of time involved by having to disconnect the electric conductors leading to the telephone apparatus on either end in order to be capable of pulling the same through said hollow swivel arm.

With this and other objects in view which will become apparent later from this specification and the accompanying drawings, I provide a swivel arm telephone mounting comprising in combination: a pedestal having a vertical socket, an angular swivel arm having a vertical leg and a horizontal leg, said vertical leg being pivotally mounted on said vertical socket, and an extension arm slidably mounted on said horizontal leg and in operation carrying at its free end a telephone apparatus, said pedestal and swivel arm and said extension arm being longitudinally divided and slotted, respectively so as to allow the insertion of the electrical conductors to said telephone apparatus without disconnecting said conductors from either of their attachment points.

Figure 1:
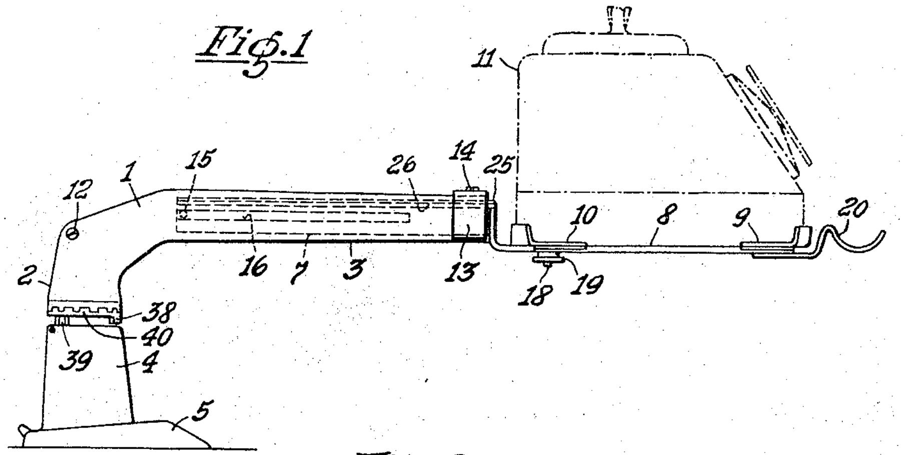
Figure 2:
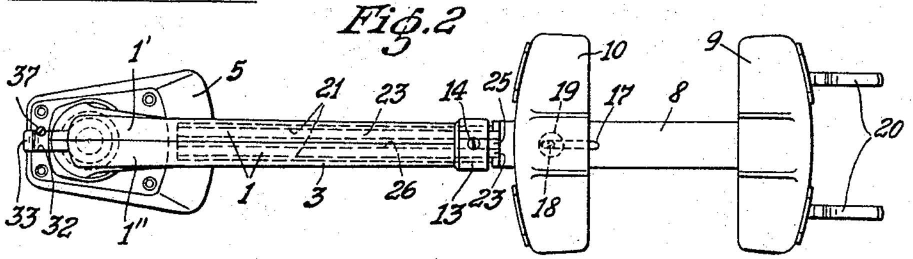
Figures 3, 4, 5, 6:
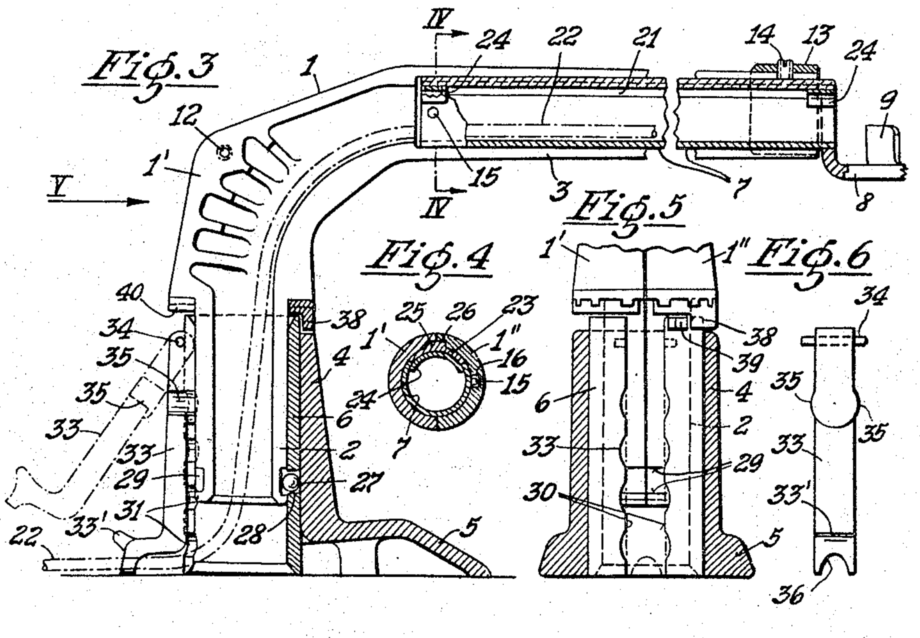
Figures 7, 8, 9, 10, 11, 12, 13:
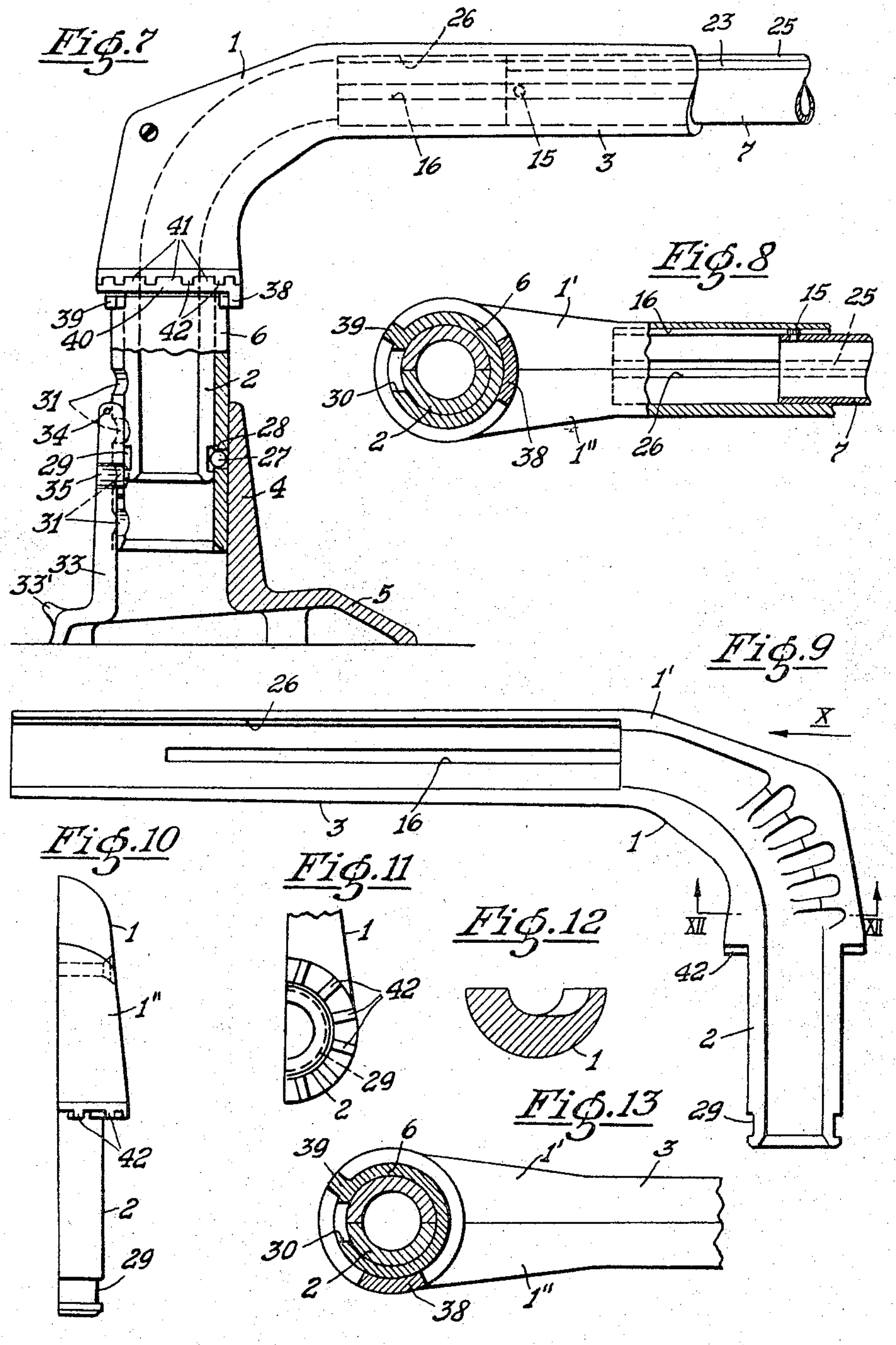

These and other features of my invention will be clearly understood from the following description of a preferred embodiment thereof given by way of example with reference to the accompanying drawing, in which:

FIG. 1 is a side elevation of a swivel arm with platform for the telephone apparatus as mounted on an office desk, FIG. 2 is a plan view to FIG. 1, FIG. 3 is a side elevation of the swivel arm on a larger scale, partly in section, FIG. 4 is a transverse section of the swivel arm on the line IV—IV of FIG. 3, FIG. 5 is a partial view of the swivel arm as viewed in the direction of the arrow V of FIG. 3, with the pedestal in section, FIG. 6 is a view of an arrester pawl, FIG. 7 is a side elevation of the swivel arm adjusted to a higher level, on a larger scale, partly in section with the extension arm partly pulled out, FIG. 8 is a horizontal section of the swivel arm on the line VIII—VIII of FIG. 7, FIG. 9 shows one half of the swivel arm as seen from inside, on a larger scale, FIG. 10 is an elevation thereof as seen in the direction of the arrow X of FIG. 9, FIG. 11 is a part view of the swivel arm from below, FIG. 12 is a cross section on line XII—XII, and FIG. 13 is a view corresponding to FIG. 8 with an abutment cam displaced 90°.

The embodiment illustrated of the swivel arm with platform for a table telephone apparatus has an angular swivel arm 1, which is hollow and composed of axially divided halves 1', 1'', whose vertical leg 2 is pivotally mounted in a vertical bearing socket 4 of a pedestal 4, 5 provided with an attachment flange 5. The bearing socket 4 of a pedestal 4, 5 is provided with an attachment flange 5. The bearing socket 4 is provided with a slidably adjustable bearing sleeve 6. In the horizontal leg 3 of the swivel arm 1 an extension arm 7 is guided restrained from turning, which carries at its outer end a platform 8, 9, 10 for receiving a table telephone apparatus 11. The two halves 1', 1'', of the swivel arm are connected at their knee portion by a screw 12, while these halves are held together at the outer end of the horizontal leg 3 by a clamp 13. The clamp 13 is arrested on the end of the swivel arm by a grub screw 14, which is accessible from above, and is open below by a longitudinal gap, which permits the insertion of the cable 22. The grub screw 14 serves at the same time also for arresting the extension arm 7 in the pulled out position actually desired. The extension arm 7 carries at its inner end an abutment pin 15 (FIGS. 3, 4, 7 and 8), which is provided in a longitudinal groove 16 (FIGS. 1, 4, 7 and 9), on the concave side of one half 1'' of the swivel arm.

The platform 8, 9, 10 receiving the telephone apparatus 11 has a carrier arm 8 with a stationary platform portion 9 and a platform portion 10, which is longitudinally adjustable on the carrier arm 8. The latter is provided with an arrester screw 18 and nut 19, which screw penetrates through a longitudinal slot 17 of the arm 8. At the outer end of the carrier arm 8 there is a depositing fork 20 for depositing the receiver during a conversation. The extension arm 7 is provided on top with a longitudinal slot 21 extending throughout its length for the insertion of the cable 22. The longitudinal slot 21 of the extension arm 7 is closed by a slide 23, which has guide lugs 24 attached at both ends and engaging on the inner wall surface of extension arm 7. For securing the extension arm 7 against turning, its slide 23 is provided on top with a longitudinal key 25 which engages in a guide groove 26 (FIG. 7) provided at the inner wall surface of the cavity 3 between the halves 1', 1''.

The vertical leg of 2 of the swivel arm 1 engages in the bearing sleeve 6, wherein it is mounted pivotally and detained against vertical displacement by a ball 27, which is mounted in a bore 28 of the bearing sleeve 6 and engages in a circular groove 29 of the leg 2. Since the bearing sleeve 6 is vertically slidable in the bearing socket 4 of the pedestal 4, 5, the swivel arm 1 may be adjusted in height together with the bearing sleeve 6. The swivel arm 1 is adjustable to four different levels. For this purpose the bearing sleeve 6 is provided on its side remote from the horizontal leg 3 with a longitudinal cut-out 30 and with rests 31 recessed into both its longitudinal edges at uniform distances from one another. The bearing socket 4 of the pedestal 4, 5 is provided with a longitudinal cut-out 32, which covers the longitudinal cut-out 30 of the bearing sleeve 6. The pedestal 4, 5, has an arrester pawl 33 mounted in the longitudinal cut-out 32 and at the same time engaging in the longitudinal cut-out 30 of the bearing sleeve 6, which pawl is pivotally attached to the upper end of the bearing socket 4 by means of an axle belt 34. This arrester pawl 33 has on each of its flanks a round cam 35, which can be brought into engagement with a pair of the rests 31 in the swung-in position of the pawl 33, and whereby allows the securing of the swivel arm 1 at the level position desired.

FIGS. 1 and 3 show the swivel arm in its lowest position, and FIG. 7 in its highest but one position. The arrester pawl 33 is provided at the bottom with a grip portion 33' and with a recess 36 for the insertion of the cable 22. In the closure position the arrester pawl 33 may be detained by a screw 37 (FIG. 2). For limiting the range of swivelling of the swivel arm 1 the vertical leg 2 of the swivel arm 1 is provided, at its portion enlarged to a greater diameter above the bearing sleeve 6, with a downwardly projecting abutment cam 38 (FIGS. 7 and 8), and the bearing bushing 6 is provided on top with an abutment cam 39 projecting radially outward. The range of swivelling of the swivel arm 1 amounts in the embodiment illustrated to about 290°. The abutment 38 of the swivel arm 1 is arranged on an adjustable collar 40, which on the side contacting a shoulder of the swivel arm 1 is provided with coupling serrations 41. The same engage in opposite serrations 42 provided on the shoulder of the swivel arm 1. By disengaging the serrated coupling 41, 42 the desired rotational adjustment of the collar 40 is made possible, so that the abutment cam 38 can be adjusted to point in any direction desired. In this manner the position of the range of swivelling can be adjusted to any side desired.

The width of the circular groove 29, by means of which the securing of the vertical leg 2 of the swivel arm is attained in the axial direction is chosen so wide, that a vertical displacement of the swivel arm by 4 to 5 millimetres is possible for disengaging the coupling 41, 42. Owing to this construction the swivel arm 1 can be raised a limited way with respect to the bearing sleeve 6, which is detained by the arrester pawl 33, and thus the clearance is provided between the top end of the bearing sleeve 6 and the adjustment collar 40 as required for disengaging the coupling 41, 42. In this manner at any time an adjustment of the rotational position of the adjustment collar 40 can be effected without waste of time, and subsequently the adjustment collar may be re-engaged in the desired rotational position simply by lowering the swivel arm.

The advantage of the telephone swivel arm described consists in that it allows a mounting on an office desk, in which the connecting cable 22, can be inserted between its two halves 1′, 1″, without requiring a disconnection of one of its two attachments, and can also be inserted into the extension arm 7, when opened by means of the slide 23, as well as into the sloted bearing sleeve 6 and the slotted pedestal 4, 5. Before fitting the swivel arm the same is dismantled into its individual components. Thereafter the telephone apparatus is placed on the platform 8, 9, 10, its cable 22 is inserted into the opened extension arm 7, and then the slide 23 is pushed in. Then the two halves 1′, 1″, of the swivel arm are connected with one another with inclusion of the extension arm 7 by fitting the screw 12 and the clamp 13, the adjustment collar 40 is fitted, and the vertical leg 2 of the swivel arm 1 is pushed into the bearing sleeve 6. After inserting the ball 27 into the bore 28, this sleeve is inserted into the pedestal 4, 5 with the pawl 33 swung out. By swinging in the pawl 33 the bearing sleeve 6 is detained at the level position desired relative to the pedestal 4, 5. Finally the arrester pawl 33 is detained in the closure position by the arrester screw 37, whereby the swivel arm is mounted ready for use.

While I have herein described and illustrated in the accompanying drawing what may be considered typical and particularly useful embodiments of my said invention I wish it to be understood that I do not limit myself to the particular details and dimensions described and illustrated; for obvious modifications will occur to a person skilled in the art.

What I claim as my invention and desire to secure by Letters Patent, is:

1. A swivel arm telephone mounting comprising in combination: a pedestal having a vertical socket, an angular swivel arm having a vertical leg and a horizontal leg, said vertical leg being pivotally mounted on said vertical socket, and an extension arm slidably mounted on said horizontal leg and in operation carrying at its free end a telephone apparatus, said pedestal and swivel arm and said extension arm being longitudinally divided and slotted, respectively, so as to allow the insertion of the electrical conductors to said telephone apparatus without disconnecting said conductors from either of their attachment points.

2. A swivel arm telephone mounting as claimed in claim 1 comprising a bearing sleeve mounted in said vertical leg and having a longitudinal cut-out with lateral recesses arranged in rows at its edges, said vertical socket of the pedestal having a vertical cut-out covering said cut-out of the bearing sleeve, and an arrester pawl pivotally mounted on said vertical socket in the cut-out thereof and having lateral cams in operation engaging selected recesses of said recesses in the edges of said bearing sleeve, thus allowing the adjustment of said swivel arm in height relative to said pedestal.

3. A swivel arm telephone mounting as claimed in claim 2, wherein said vertical leg is movable rotationally and secured axially relative to said bearing sleeve, and is vertically slidable in said socket of the pedestal, while being restrained from turning therein by said arrester pawl.

4. A swivel arm telephone mounting as claimed in claim 2, comprising an adjustment collar having a serrated end face, said vertical leg of the swivel arm having a complementary serration at its end face, said two serrations forming together a coupling allowing adjustment of said swivel arm rotationally relative to said adjustment collar, said collar having an abutment cam on its face opposite said serrations and said bearing sleeve having another abutment cam projecting laterally outward and cooperating with said abutment cam of said adjustment collar and limiting together with it the range of swivelling of said swivel arm.

5. A swivel arm telephone mounting comprising in combination: a pedestal having a vertical socket, an angular hollow swivel arm, said pedestal and swivel arm each having two halves jointed to one another on a longitudinal vertical plane, said swivel arm having a vertical leg pivotally mounted on said socket and a horizontal leg, a longitudinally slotted extension arm adjustably mounted on the horizontal leg of said hollow swivel arm so as to be capable of being pulled out at various lengths, a transversely divided platform adaptable to various sizes of telephone apparatus mounted at the free end of said extension arm, and an auxiliary fork mounted on the free end of said platform for depositing the telephone receiver thereon during a conversation.

6. A swivel arm telephone mounting as claimed in claim 5, comprising connecting means detachably connecting said two halves of said swivel arm with one another, said extension arm having a longitudinal slot extending over its entire length, a closure slide mounted on said extension arm capable of covering said longitudinal slot, a key-and-groove guide guiding said extension arm in said swivel arm and restraining said extension arm from turning relative to said swivel arm, and an abutment pin mounted on said extension arm engaging in a groove of said swivel arm so as to limit the movement of said extension arm out of said swivel arm.

References Cited

UNITED STATES PATENTS 2,535,330 12/1950 Stone ______________ 179—149

FOREIGN PATENTS 648,604 1/1951 Great Britain.

KATHLEEN H. CLAFFY, *Primary Examiner*.

WILLIAM C. COOPER, *Examiner*.